United States Patent
Nara et al.

(10) Patent No.: US 10,331,892 B2
(45) Date of Patent: Jun. 25, 2019

(54) SYSTEMS AND METHODS FOR SECURE BOOT AND RUNTIME TAMPER DETECTION

(71) Applicant: Dell Products L.P., Round Rock, TX (US)

(72) Inventors: Prakash Nara, Round Rock, TX (US); Wei Liu, Austin, TX (US); Charles E. Rose, Nashua, NH (US); Santosh Kumar, Round Rock, TX (US); Sudhir Vittal Shetty, Cedar Park, TX (US); Marshal F. Savage, Austin, TX (US); Rhushabh Bhandari, Cedar Park, TX (US); Madhav Karri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 159 days.

(21) Appl. No.: 15/441,601

(22) Filed: Feb. 24, 2017

(65) Prior Publication Data
US 2018/0247059 A1    Aug. 30, 2018

(51) Int. Cl.
| | | |
|---|---|---|
| *G06F 15/177* | (2006.01) | |
| *G06F 9/00* | (2006.01) | |
| *G06F 21/57* | (2013.01) | |
| *G06F 9/4401* | (2018.01) | |
| *G06F 21/62* | (2013.01) | |
| *H04L 9/32* | (2006.01) | |
| *G06F 21/55* | (2013.01) | |
| *G06F 8/61* | (2018.01) | |

(52) U.S. Cl.
CPC ........... *G06F 21/575* (2013.01); *G06F 9/4401* (2013.01); *G06F 21/554* (2013.01); *G06F 21/6218* (2013.01); *H04L 9/3247* (2013.01); *G06F 8/63* (2013.01)

(58) Field of Classification Search
CPC .. G06F 21/575; G06F 21/6218; G06F 9/4401; H04L 9/3247; H04L 9/3242
See application file for complete search history.

(56) References Cited

U.S. PATENT DOCUMENTS

| | | | | |
|---|---|---|---|---|
| 2008/0270782 A1* | 10/2008 | Bone | ....................... | H04L 67/14 713/2 |
| 2012/0117658 A1* | 5/2012 | Haga | ....................... | G06F 21/64 726/26 |
| 2012/0260250 A1* | 10/2012 | Maeda | .................... | G06F 21/53 718/1 |

* cited by examiner

*Primary Examiner* — Xuxing Chen
(74) *Attorney, Agent, or Firm* — Jackson Walker L.L.P.

(57) ABSTRACT

A method may include determining if both of two redundant operating system images for executing functionality of a chassis management controller were found during one or more previous boot sessions of the chassis management controller to be unsecure, wherein each operating system image comprises an integrated kernel and initial file root system stored in a respective first partition of a memory of the chassis management controller, verity hashes of a root file system of such operating system image, the verity hashes stored in a respective second partition of the memory, and the root file system of such operating system image stored in a respective third partition of the memory. The method may also include, in response to determining that one of the two redundant operating system images is secure, initiate verification of such operating system image to determine if such operating system image has indicia of tampering.

21 Claims, 3 Drawing Sheets

SYSTEMS AND METHODS FOR SECURE BOOT AND RUNTIME TAMPER DETECTION

TECHNICAL FIELD

The present disclosure relates in general to information handling systems, and more particularly to providing a secure boot and runtime tamper detection in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Security in information handling systems is of paramount importance, and unsecure systems can be prone to "rootkit" attacks, physical tampering of information handling system components (e.g., custom imaging of storage devices or memories), and thus can compromise the information handling system.

SUMMARY

In accordance with the teachings of the present disclosure, certain disadvantages and problems associated with security and tamper detection of information handling systems have been reduced or eliminated.

In accordance with embodiments of the present disclosure, an information handling system may include a processor, a memory communicatively coupled to the processor, and a basic input/output system. The memory may have stored thereon two redundant operating system images, each operating system image comprising an integrated kernel and initial file root system stored in a respective first partition of the memory, verity hashes of a root file system of such operating system image, the verity hashes stored in a respective second partition of the memory, and the root file system of such operating system image stored in a respective third partition of the memory. The basic input/output system may be configured to, when executed by the processor, determine if both of the redundant operating system images were found during one or more previous boot sessions of the information handling system to be unsecure and, in response to determining that one of the two redundant operating system images is secure, initiating verification of such operating system image to determine if such operating system image has indicia of tampering.

In accordance with these and other embodiments of the present disclosure, a chassis may include a plurality of slots each configured to receive a corresponding modular information handling system and a chassis management controller communicatively coupled to the plurality of slots and comprising a memory having stored thereon two redundant operating system images for executing the functionality of the chassis management controller. Each operating system image may include an integrated kernel and initial file root system stored in a respective first partition of a memory of the chassis management controller, verity hashes of a root file system of such operating system image, the verity hashes stored in a respective second partition of the memory, and the root file system of such operating system image stored in a respective third partition of the memory. The chassis management controller may be configured to determine if both of the redundant operating system images were found during one or more previous boot sessions of the chassis management controller to be unsecure and, in response to determining that one of the two redundant operating system images is secure, initiating verification of such operating system image to determine if such operating system image has indicia of tampering.

In accordance with these and other embodiments of the present disclosure, a method may include determining if both of two redundant operating system images for executing functionality of a chassis management controller were found during one or more previous boot sessions of the chassis management controller to be unsecure, wherein each operating system image comprises an integrated kernel and initial file root system stored in a respective first partition of a memory of the chassis management controller, verity hashes of a root file system of such operating system image, the verity hashes stored in a respective second partition of the memory, and the root file system of such operating system image stored in a respective third partition of the memory. The method may also include, in response to determining that one of the two redundant operating system images is secure, initiate verification of such operating system image to determine if such operating system image has indicia of tampering.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
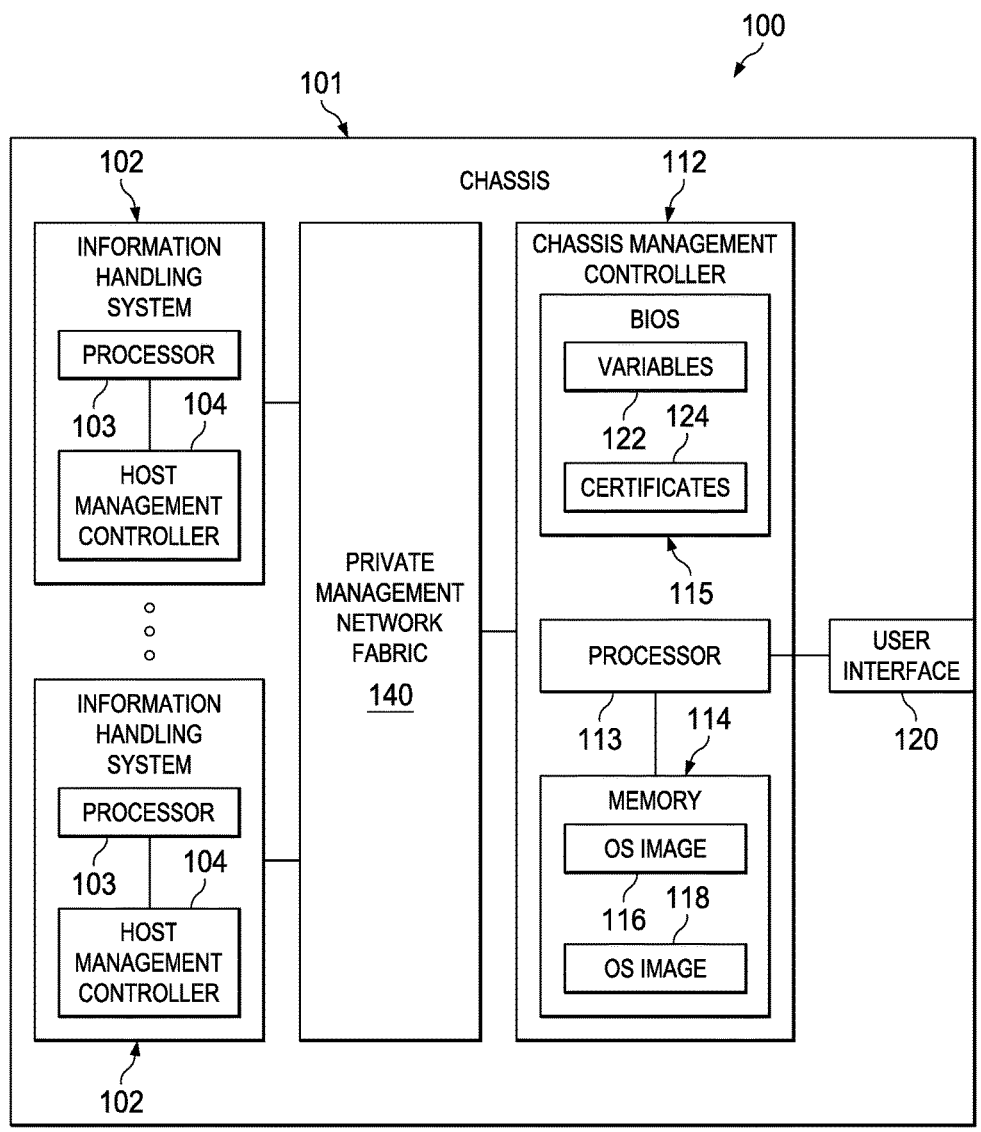
FIG. 1 illustrates a block diagram of an example system chassis with multiple modular information handling systems disposed therein, in accordance with embodiments of the present disclosure.
Figure 2:
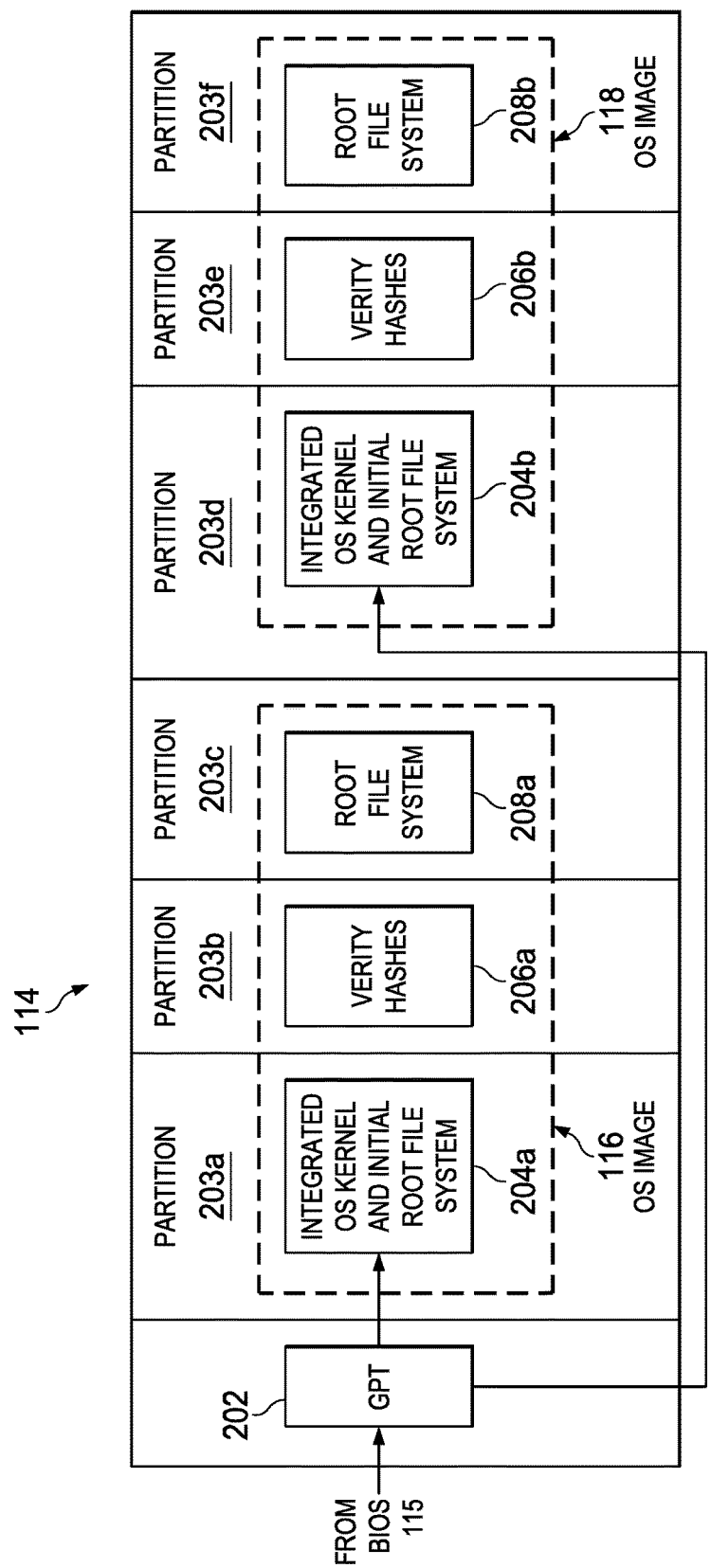
FIG. 2 illustrates a block diagram of a memory, in accordance with embodiments of the present disclosure.
Figure 3:
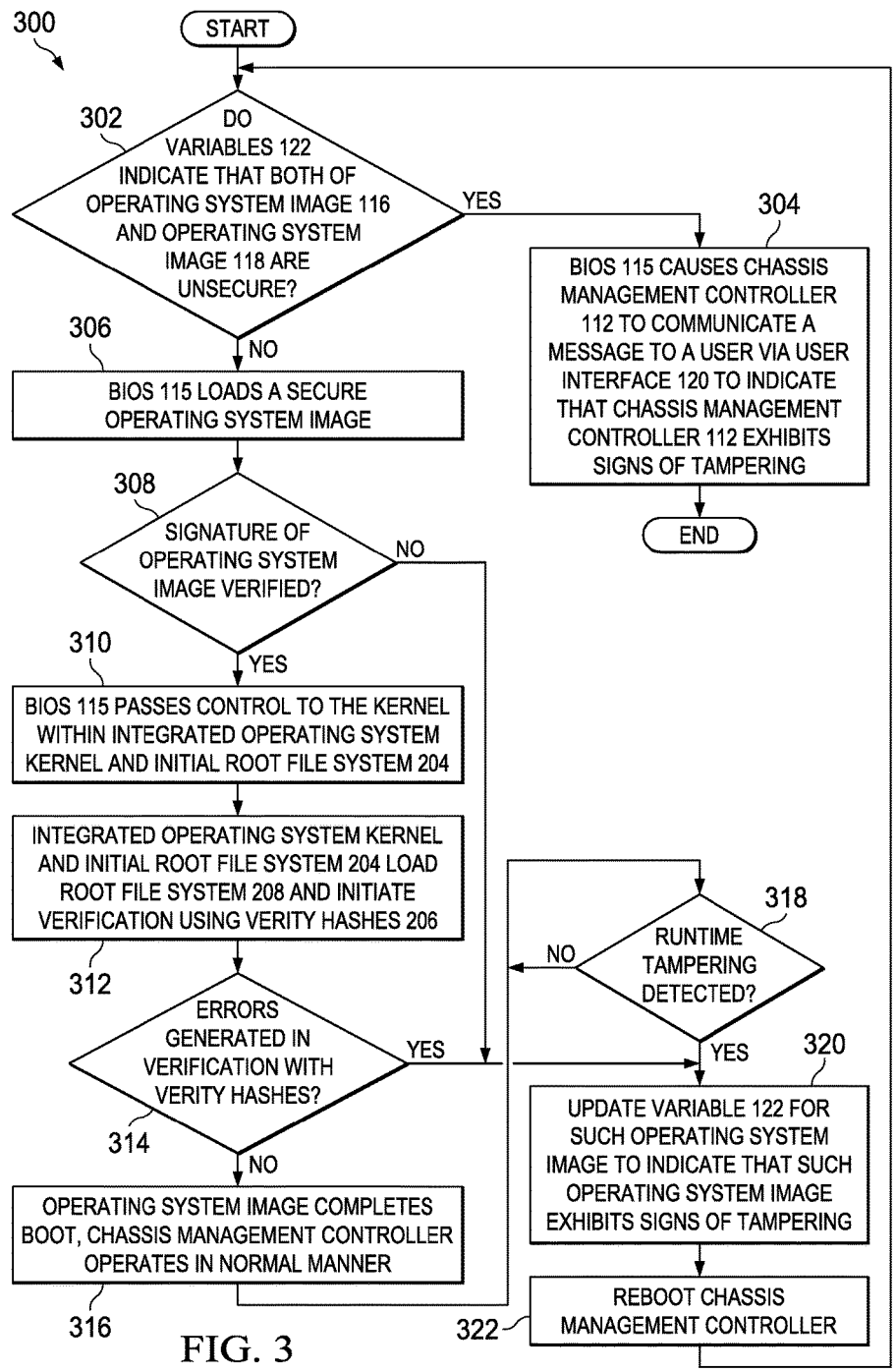
FIG. 3 illustrates a flow chart of an example method for secure boot and runtime tamper detection, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various I/O devices, such as a keyboard, a mouse, and a video display. The information handling system may also include one or more busses operable to transmit communication between the various hardware components.

For the purposes of this disclosure, information handling resources may broadly refer to any component system, device or apparatus of an information handling system, including without limitation processors, buses, memories, I/O devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such as wires, optical fibers, microwaves, radio waves, and other electromagnetic and/or optical carriers; and/or any combination of the foregoing.

FIG. 1 illustrates a block diagram of an example system 100 comprising a chassis 101 with multiple modular information handling systems 102 disposed therein, in accordance with embodiments of the present disclosure. As depicted in FIG. 1, system 100 may comprise a chassis 101 including a plurality of information handling systems 102, a user interface 120, a private management network fabric 140, and a chassis management controller 112. In addition to information handling systems 102, user interface 120, private management network fabric 140, and chassis management controller 112, chassis 101 may include one or more other information handling resources.

An information handling system 102 may generally be operable to receive data from and/or communicate data to one or more information handling resources of chassis 101, including communicating with chassis management controller 112 via private management network fabric 140. In certain embodiments, an information handling system 102 may be a server. In such embodiments, an information handling system may comprise a blade server having modular physical design. In these and other embodiments, an information handling system 102 may comprise an M class server. As depicted in FIG. 1, an information handling system 102 may include a processor 103 and a host management controller 104. In addition to processor 103 and host management controller 104, information handling system 102 may include one or more other information handling resources.

A processor 103 may include any system, device, or apparatus configured to interpret and/or execute program instructions and/or process data, and may include, without limitation, a microprocessor, microcontroller, digital signal processor ("DSP"), application specific integrated circuit ("ASIC"), or any other digital or analog circuitry configured to interpret and/or execute program instructions and/or process data. In some embodiments, processor 103 may interpret and/or execute program instructions and/or process data stored in a memory or other computer-readable media accessible to processor 103.

Information handling system 102 may include a host management controller 104. Host management controller 104 may be implemented by, for example, a microprocessor, microcontroller, DSP, ASIC, EEPROM, or any combination thereof. Host management controller 104 may be configured to communicate with chassis management controller 112. Such communication may be made, for example, via private management network fabric 140. Host management controller 104 may be configured to provide out-of-band management facilities for management of information handling system 102. Such management may be made by information handling resources of chassis 101 even if information handling system 102 is powered off or powered to a standby state. Host management controller 104 may include a processor, memory, and network connection separate from the rest of information handling system 102. In certain embodiments, host management controller 104 may include or may be an integral part of a baseboard management controller (BMC), Dell Remote Access Controller (DRAC) or an Integrated Dell Remote Access Controller (iDRAC).

Chassis management controller 112 may comprise any system, device, or apparatus configured to facilitate management and/or control of system 100 embodied by chassis 101, its information handling systems 102, and/or one or more of its component information handling resources. Chassis management controller 112 may be configured to issue commands and/or other signals to manage and/or control an information handling system 102 and/or information handling resources of system 100. Chassis management controller 112 may comprise a microprocessor, microcontroller, DSP, ASIC, field programmable gate array ("FPGA"), EEPROM, or any combination thereof. In some embodiments, chassis management controller 112 may provide a management console for user/administrator access to these functions. For example, chassis management controller 112 may implement Web Services Management ("WS-MAN") or another suitable management protocol permitting a user to remotely access chassis management controller 112 to configure system 100 and its various information handling resources. In such embodiments, chassis management controller 112 may interface with a network interface, thus allowing for "out-of-band" control of system 100, such that communications to and from chassis management controller 112 are communicated via a management channel physically isolated from an "in-band" communication channel of chassis 101 for which non-management communication may take place. Thus, for example, if a failure occurs in system 100 that prevents an administrator from interfacing with system 100 via the in-band communication channel or a user interface associated with chassis 101 (e.g., power failure, etc.), the administrator may still be able to monitor and/or manage system 100 (e.g., to diagnose problems that may have caused failure) via chassis management controller 112. In the same or alternative embodiments, chassis management controller 112 may allow an administrator to remotely manage one or more parameters associated with operation of system 100 and its various information handling resources (e.g., power usage, processor allocation, memory allocation, security privileges, etc.). In some embodiments, chassis management controller 112 may include a management services module.

As shown in FIG. 1, chassis management controller 112 may include a processor 113, a memory 114, and a BIOS 115. Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in a memory and/or another component of information handling system 102 or chassis management controller 112 (e.g., memory 114).

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to chassis management controller 112 is turned off. In some embodiments, memory 114 may comprise an M.2 form factor solid state drive.

As shown in FIG. 1, memory 114 may have stored thereon operating system images 116 and 118. Operating system images 116 and 118 may each comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system image 116 and/or 118. Active portions of operating system images 116 and 118 may be transferred from memory 114 for execution by processor 113. Although operating system images 116 and 118 are shown in FIG. 1 as stored in memory 114, in some embodiments operating system images 116 and/or 118 may be stored in storage media accessible to processor 113, and active portions of operating system images 116 and/or 118 may be transferred from such storage media to memory 114 for execution by processor 113. Partitioning of memory 114 and storage of operating system images 116 and 118 within such partitions is described in greater detail below with respect to FIG. 2

A BIOS 115 may include any system, device, or apparatus configured to identify, test, and/or initialize information handling resources of chassis management controller 112, and/or initialize interoperation of chassis management controller 112 with information handling systems and other information handling resources. "BIOS" may broadly refer to any system, device, or apparatus configured to perform such functionality, including without limitation, a Unified Extensible Firmware Interface (UEFI). In some embodiments, BIOS 115 may be implemented as a program of instructions that may be read by and executed on processor 113 to carry out the functionality of BIOS 115. In these and other embodiments, BIOS 115 may comprise boot firmware configured to be the first code executed by processor 113 when chassis management controller 112 is booted and/or powered on. As part of its initialization functionality, code for BIOS 115 may be configured to set components of management controller 112 into a known state, so that one or more applications (e.g., an operating system or other application programs) stored on compatible media (e.g., disk drives) may be executed by processor 113 and given control of chassis management controller 112.

As shown in FIG. 1, BIOS 115 may have stored thereon variables 122 and certificates 124. Variables 122 may include one or more parameters that may be used by BIOS 115 to maintain a tampering status of operating system images 116 and 118 across boot sessions of chassis management controller 112, as described in greater detail below. Each certificate 124 may comprise an electronic document used to authenticate a signature of an operating system image 116 and/or 118, as described in greater detail below.

User interface 120 may comprise any instrumentality or collection of instrumentalities configured to communicate information to and/or receive information from a human user. For example, in some embodiments, user interface 120 may comprise a keyboard-video-mouse device communicatively coupled to chassis management controller 112 in order to manipulate or control the functionality of chassis management controller 112. As another example, in these and other embodiments, user interface 120 may comprise an interactive liquid crystal display screen (or similar device) communicatively coupled to chassis management controller 112 in order to manipulate or control the functionality of chassis management controller 112.

Private management network fabric 140 may comprise a network and/or fabric configured to couple information handling systems 102 (e.g., via host management controller 104) and chassis management controller 112 to each other and/or one or more other information handling resources of chassis 101. In these and other embodiments, private management network fabric 140 may include a communication infrastructure, which provides physical connections, and a management layer, which organizes the physical connections and information handling resources communicatively coupled to private management network fabric 140. Private management network fabric 140 may be implemented as, or may be a part of, an Ethernet local area network (LAN) or any other appropriate architecture or system that facilitates the communication of signals, data, and/or messages.

FIG. 2 illustrates a block diagram of memory 114, in accordance with embodiments of the present disclosure. As shown in FIG. 2, memory 114 may comprise a globally unique identifier (QUID) partition table (GPT) 202 and a plurality of partitions 203 (e.g., partitions 203a, 203b, 203c, 203d, 203e, and 203f). GPT 202 may comprise any suitable table or other data structure setting forth the layout of partitions 203 on memory 114, as is known in the art. Each partition 203 may comprise a fixed-size subset of a memory 114 which may be treated as a unit by an operating system, BIOS, or other program.

As also shown in FIG. 2, each of operating system image 116 and operating system image 118 may be divided into particular portions wherein each such portion is stored in a respective partition 203. For example, as shown in FIG. 2, operating system image 116 may be divided into an integrated operating system kernel and initial root file system (e.g., initrd) 204a, verity hashes 206a (e.g., device manager verity hashes), and root file system 208a, and stored on partitions 203a, 203b, and 203c, respectively. Similarly, operating system image 118 may be divided into an integrated operating system kernel and initial root file system (e.g., initrd) 204b, verity hashes 206b (e.g., device manager verity hashes), and root file system 208b, and stored on partitions 203d, 203e, and 203f, respectively.

When being stored in memory 114, each integrated operating system kernel and initial root file system 204 may be fused together into a single image and signed. Each integrated operating system kernel and initial root file system 204 may also include a root hash (e.g., stored in initrd) which may be required for verity verification. In addition, each root file system 208 may include user applications of its respective operating system and may also be signed when stored to memory 114. Each verity hash 206 may include a computed hash of its respective root file system, and may also be signed when stored to memory 114.

In some embodiments, operating system image 116 and operating system image 118 may be identical or similar, so as to provide redundancy. Accordingly, BIOS 115 may be configured in a hard-coded manner to boot to one of two redundant boot options, each boot option pointing to an integrated operating system kernel and initial root file system 204.

FIG. 3 illustrates a flow chart of an example method 300 for secure boot and runtime tamper detection, in accordance with embodiments of the present disclosure. According to some embodiments, method 300 may begin at step 302. As noted above, teachings of the present disclosure may be implemented in a variety of configurations of system 100. As such, the preferred initialization point for method 300 and the order of the steps comprising method 300 may depend on the implementation chosen.

At step 302, chassis management controller 112 may boot and BIOS 115 may reference variables 122 to determine statuses of operating system image 116 and operating system image 118. For example, variables 122 may include one variable indicative of whether operating system image 116 is unsecure (e.g., exhibited tampering in a previous boot session of chassis management controller 112) and another variable indicative of whether operating system image 118 is unsecure (e.g., exhibited tampering in a previous boot session of chassis management controller 112). If variables 122 indicate that both of operating system image 116 and operating system image 118 are unsecure, method 300 may proceed to step 304. Otherwise, method 300 may proceed to step 306.

At step 304, in response to variables 122 indicating that both of operating system image 116 and operating system image 118 are unsecure, BIOS 115 may cause chassis management controller 112 to communicate a message to a user via user interface 120 to indicate that chassis management controller 112 exhibits signs of tampering. After completion of step 304, method 300 may end.

At step 306, in response to variables 122 indicating that at least one of operating system image 116 and operating system image 118 are secure, BIOS 115 loads a secure operating system image. At step 308, BIOS 115 attempts to verify a signature of the operating system image (e.g., using one or more certificates 124). If BIOS 115 is able to verify the signature, method 300 may proceed to step 310. Otherwise, method 300 may proceed to step 320.

At step 310, in response to verification of the signature of the operating system image, BIOS 115 may pass control to the kernel within integrated operating system kernel and initial root file system 204. At step 312, integrated operating system kernel and initial root file system 204 may load root file system 208 and initiate verification of root file system 208 with verity hashes 206. At step 314, a process (e.g., within integrated operating system kernel and initial root file system 204 or another component of chassis management controller 112) may monitor errors generated in connection with comparing verity hashes 206 against root file system 208, which may indicate tampering. If errors are generated during verification with verity hashes 206, method 300 may proceed to step 320. Otherwise, method 300 may proceed to step 316.

At step 316, in response to successful verification with verity hashes 206, the operating system image may complete its boot process, and chassis management controller 112 may operate in a normal manner. At step 318, during runtime of the operating system, a process (e.g., within integrated operating system kernel and initial root file system 204 or another component of chassis management controller 112) may continuously monitor for errors generated in connection with comparing verity hashes 206 against root file system 208, which may indicate runtime tampering of the operating system. If runtime tampering is detected, method 300 may proceed to step 320. Otherwise, method 300 may remain at step 318 until any such runtime tampering is detected.

At step 320, in response to an error in a signature verification or hash verification of the operating system image, the process may update a variable 122 for such operating system image to indicate that such operating system image exhibits signs of tampering. At step 322, chassis management controller 112 may reboot, and method 300 may start again at step 302.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using system 100, and/or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
    a processor;
    a memory communicatively coupled to the processor and having stored thereon two redundant operating system images, each operating system image comprising:
        an integrated kernel and initial root file system stored in a respective first partition of the memory;
        verity hashes of a root file system of such operating system image, the verity hashes stored in a respective second partition of the memory; and
        the root file system of such operating system image stored in a respective third partition of the memory; and
    a basic input/output system configured to, when executed by the processor:
        determine if both of the redundant operating system images were found during one or more previous boot sessions of the information handling system to be unsecure; and
        in response to determining that one of the two redundant operating system images is secure, initiating verification of such operating system image to determine if such operating system image has indicia of tampering, wherein the verification includes:
        verifying a signature of the integrated kernel and initial root file system of such operating system image;
        loading the integrated kernel and initial root file system responsive to verifying the signature; and
        verifying the root file system of such operating system based on the verity hashes of such operating system.

2. The information handling system of claim 1, wherein loading the integrated kernel and initial root file system responsive to verifying the signature and verifying the root file system of such operating system based on the verity hashes of such operating system is performed by the integrated kernel and initial root file system executing on the processor.

3. The information handling system of claim 1, wherein the verification of such operating system image further comprises completing execution of such operating system image in response to verification of the root file system.

4. The information handling system of claim 1, wherein verification of such operating system image further comprises verifying the root file system of such operating system based on the verity hashes of such operating system during runtime of such operating system.

5. The information handling system of claim 1, wherein the verification of such operating system image further comprises, in response to a failure in verification of such operating system image:
    writing a variable to the basic input/output system such that the basic input/output system determines such operating system image to be unsecure during a subsequent boot of the information handling system; and
    rebooting the information handling system.

6. The information handling system of claim 1, wherein the verification of such operating system image further comprises, in response to determining that the two redundant operating system images are unsecure, communicating a message to a user indicating that the two redundant operating system images are unsecure.

7. The information handling system of claim 1, wherein the integrated kernel and initial root file system, the verity hashes, and the root file system of each operating system image is signed with a digital signature verifiable by a certificate stored in the basic input/output system.

8. A chassis comprising:
    a plurality of slots each configured to receive a corresponding modular information handling system; and
    a chassis management controller communicatively coupled to the plurality of slots and comprising a memory communicatively having stored thereon two redundant operating system images for executing functionality of the chassis management controller, each operating system image comprising:
        an integrated kernel and initial root file system stored in a respective first partition of a memory of the chassis management controller;
        verity hashes of a root file system of such operating system image, the verity hashes stored in a respective second partition of the memory; and
        the root file system of such operating system image stored in a respective third partition of the memory; and
    wherein the chassis management controller is configured to:
        determine if both of the redundant operating system images were found during one or more previous boot sessions of the chassis management controller to be unsecure; and
        in response to determining that one of the two redundant operating system images is secure, initiating verification of such operating system image to determine if such operating system image has indicia of tampering; wherein the verification includes:
        verifying a signature of the integrated kernel and initial root file system of such operating system image;
        loading the integrated kernel and initial root file system responsive to verifying the signature; and
        verifying the root file system of such operating system based on the verity hashes of such operating system.

9. The chassis of claim 8, wherein loading the integrated kernel and initial root file system responsive to verifying the signature and verifying the root file system of such operating system based on the verity hashes of such operating system is performed by the integrated kernel and initial root file system.

10. The chassis of claim 8, wherein the verification of such operating system image further comprises completing execution of such operating system image in response to verification of the root file system.

11. The chassis of claim 8, wherein verification of such operating system image further comprises verifying the root file system of such operating system based on the verity hashes of such operating system during runtime of such operating system.

12. The chassis of claim 8, wherein the verification of such operating system image further comprises, in response to a failure in verification of such operating system image:
   writing a variable to the chassis management controller such that the chassis management controller is configured to determine such operating system image to be unsecure during a subsequent boot of the chassis management controller; and
   rebooting the chassis management controller.

13. The chassis of claim 8, wherein the verification of such operating system image further comprises, in response to determining that the two redundant operating system images are unsecure, communicating a message to a user indicating that the two redundant operating system images are unsecure.

14. The chassis of claim 8, wherein the integrated kernel and initial root file system, the verity hashes, and the root file system of each operating system image is signed with a digital signature verifiable by a certificate.

15. A method comprising:
   determining if both of two redundant operating system images for executing functionality of a chassis management controller were found during one or more previous boot sessions of the chassis management controller to be unsecure, wherein each operating system image comprises:
      an integrated kernel and initial root file system stored in a respective first partition of a memory of the chassis management controller;
      verity hashes of a root file system of such operating system image, the verity hashes stored in a respective second partition of the memory; and
      the root file system of such operating system image stored in a respective third partition of the memory; and
   in response to determining that one of the two redundant operating system images is secure, initiate verification of such operating system image to determine if such operating system image has indicia of tampering, wherein the verification includes:
      verifying a signature of the integrated kernel and initial root file system of such operating system image;
      loading the integrated kernel and initial root file system responsive to verifying the signature; and
      verifying the root file system of such operating system based on the verity hashes of such operating system.

16. The method of claim 15, wherein loading the integrated kernel and initial root file system responsive to verifying the signature and verifying the root file system of such operating system based on the verity hashes of such operating system is performed by the integrated kernel and initial root file system executing on a processor.

17. The method of claim 15, wherein the verification of such operating system image further comprises completing execution of such operating system image in response to verification of the root file system.

18. The method of claim 15, wherein verification of such operating system image further comprises verifying the root file system of such operating system based on the verity hashes of such operating system during runtime of such operating system.

19. The method of claim 15, wherein the verification of such operating system image further comprises, in response to a failure in verification of such operating system image:
   writing a variable to the chassis management controller such that the chassis management controller determines such operating system image to be unsecure during a subsequent boot of the chassis management controller; and
   rebooting the chassis management controller.

20. The method of claim 15, wherein the verification of such operating system image further comprises in response to determining that the two redundant operating system images are unsecure, communicating a message to a user indicating that the two redundant operating system images are unsecure.

21. The method of claim 15, wherein the integrated kernel and initial root file system, the verity hashes, and the root file system of each operating system image is signed with a digital signature verifiable by a certificate.

* * * * *